United States Patent
Brown

Patent Number: 5,431,182
Date of Patent: Jul. 11, 1995

[54] SMART VALVE POSITIONER

[75] Inventor: Gregory C. Brown, Minnetonka, Minn.

[73] Assignee: Rosemount, Inc., Eden Prairie, Minn.

[21] Appl. No.: 230,492

[22] Filed: Apr. 20, 1994

[51] Int. Cl.[6] .............................................. G05B 11/48
[52] U.S. Cl. ..................................... 137/85; 137/487.5
[58] Field of Search ................................ 137/85, 487.5

[56] References Cited

U.S. PATENT DOCUMENTS

| | | | |
|---|---|---|---|
| 4,481,967 | 11/1984 | Frick | 137/85 |
| 4,492,246 | 1/1985 | Prescott et al. | 137/85 |
| 4,665,938 | 5/1987 | Brown et al. | 137/85 |
| 4,712,173 | 12/1987 | Fujiwara et al. | 365/138 |
| 4,783,659 | 11/1988 | Frick | 340/870 |
| 5,197,328 | 3/1993 | Fitzgerald | 73/168 |

OTHER PUBLICATIONS

Brochure: "Smart Positioner," Icot Systems Corporation, Saddle Brook, N.J., pp. 1-15 (undated).
"Intelligent Positioner," R. Kaspers, Paper #91-0557, Copyright ISA 1991, pp. 1913-1925.
Brochure: "Corrosive Service Control Valve Package," Fisher Controls, Marshalltown, Iowa, Bulletin 50:010, Apr. 1991, pp. 1-12.
Brochure: "X-Pac Electraulic Actuators and Drives," REXA Corporation, Canton, Mass., Bulletin XLS2, Sep. 1991.
Brochure: "MS75E Electropneumatic Valve Positioner," Xomax Corporation, Cincinnati, Ohio, Sep. 1990.
Press Release: "Fieldbus Operated Control Valve," Masoneilan Division, Dresser UK Ltd., 1992.
Brochure: "Current-to-Pressure Transducer," Rosemount Inc., Eden Prairie, Minn., Copyright 1993, pp. 1-8.

*Primary Examiner*—Gerald A. Michalsky
*Attorney, Agent, or Firm*—Westman, Champlin & Kelly

[57] ABSTRACT

A valve positioner controls operation of a valve in a process control system. The valve positioner is coupled to a process control loop over which it receives a signal representative of a desired valve position and operating power for the positioner. The valve positioner controls a pneumatic actuator which in turn controls position of the valve. The valve positioner includes a microprocessor, associated digital circuitry and analog circuitry. Low power analog circuitry performs PID control functions. The microprocessor periodically updates at least one digital control signal used to selectively program a resistance in the analog circuitry. The combination of digital and analog circuitry allows reduced power consumption because the analog PID function consumes less power and is performed more quickly than the microprocess could perform the same function.

18 Claims, 4 Drawing Sheets

SMART VALVE POSITIONER

BACKGROUND OF THE INVENTION

The present invention relates to a valve positioner for controlling a valve which affects a process variable. More specifically, the present invention relates to a valve positioner having a microprocessor.

Various types of positioners are used in the process control industry. Some positioners are mechanically coupled to an actuator while some incorporate the positioner within the actuator. The actuator provides means for physically positioning the valve and may be electric, hydraulic or pneumatic. Electric actuators have a current signal which drives a motor which positions the valve. Hydraulic actuators have oil-filled means for positioning the valve. By far the most common in the process control industry, a pneumatic actuator has a piston or a combination of a spring and diaphragm which position the valve. Depending on the application and the level of control integration, positioners receive several types of input from a controller which are representative of the desired valve position. One type is a current input having a 4-20 mA or a 10-50 mA magnitude, a second is a digital signal superimposed on the current signal and a third is a fully digital input such as Fieldbus or Hodbus ®. Alternatively, the positioner may receive a 3-15 or 6-30 pound per square inch (PSI) pneumatic input representative of the desired valve position. Depending on the level of integration and the application as well, positioners have different types of outputs. Some positioners provide an output current to an electric actuator motor, while still others have a fast responding hydraulic output. The most common type of positioner output is a 0-200 PSI pneumatic output. Positioner, as the word is used in this application, includes all these field mounted instruments, including the various inputs and outputs, and their respective means for positioning valves, if applicable. U.S. Pat. Nos. 4,665,938 and 5,197,328 are examples of valve positioners.

In the most common case of a spring and diaphragm actuator, the diaphragm deflects with the pressure delivered by the positioner, thereby exerting a force or torque on a control valve stem or rotary member, respectively, so as to change the position of the valve. Many positioners have a mechanical or an electronic position sensor to provide a position signal which is fed back into a microprocessor-based control section of the positioner. No matter what the specific means are for delivering force to position a valve, positioners having microprocessors are known. Existing microprocessor-based positioners provide good loop dynamic response, but have a limited band-width so that their usage is limited to slow control loops such as one which controls level in a tank or temperature in a reactor.

With the introduction of microprocessors into valve positioners, the microprocessor is being called on to perform increasingly complex functions, resulting in higher overall power requirements for the positioner. In control systems using, for example, the 4-20 mA, 10-50 mA, Fieldbus and Modbus ® protocols, the operating power of the positioner is limited, since the positioner operates exclusively on the power supplied by the control loop. This limitation has placed an upper limit on the amount of computation and the clock frequency (dynamic response) of the microprocessor in the valve positioner. As technology has advanced, it has been possible to obtain more computational power from a microprocessor without increasing the electrical power requirements. However, the desire to increase control and performance of valve positioners has outpaced the ability of the microprocessor to deliver the requirements under the aforementioned electrical power constraints. A low Dower positioner with wide bandwidths under computer control is needed.

SUMMARY OF THE INVENTION

A valve positioner assembly includes a valve positioner which provides a control pressure to a pneumatic actuator operably coupled to a valve. The valve positioner has an interface coupled to a process control loop for receiving a desired valve position and an analog FID controller which generates a command output for controlling the value, based upon the desired valve position which and a sensed valve position. A microprocessor calculates PID constants, each of which control a variable impedance in the analog PID controller. The digital control signal is stored in a latch and is periodically updated by the microprocessor. In one embodiment, first and second power supplies provide power to the positioner as received over the control loop. The supplies are connected in series.

DETAILED DESCRIPTION OF THE PREFERRED EMBODIMENTS

Figure 1:
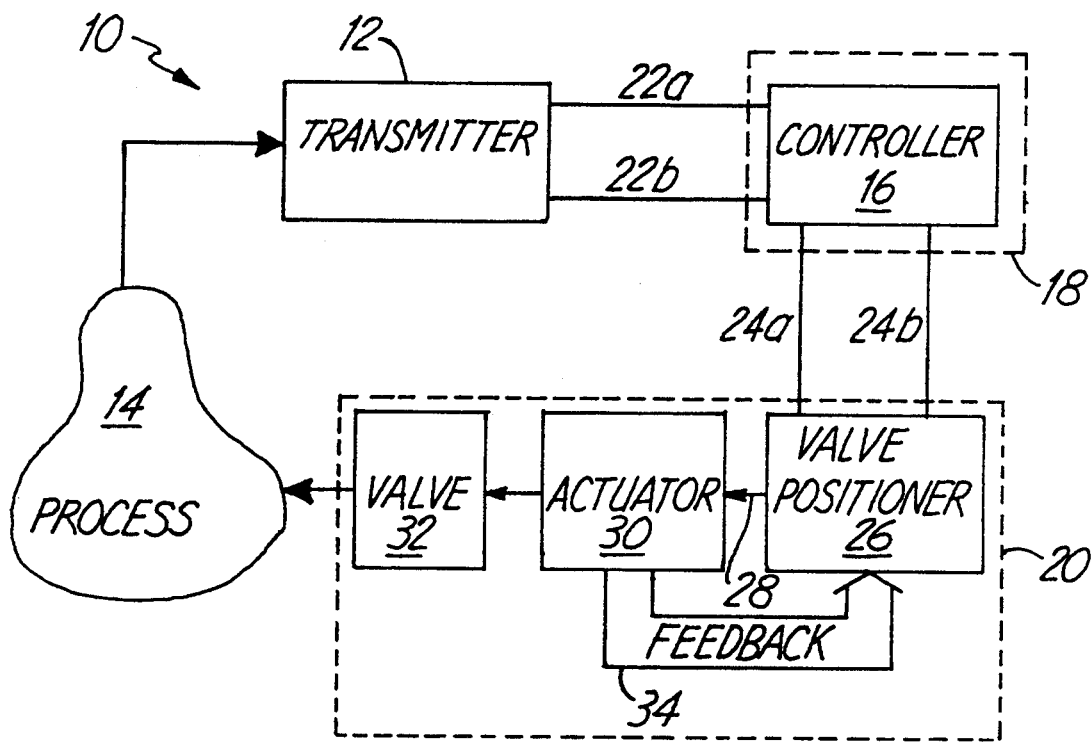
FIG. 1 is a block diagram of a control loop including a valve positioner in accordance with the invention.

FIG. 1 shows a process control loop generally at 10 which typically includes two-wire transmitter 12 which senses a process variable representative of process 14, a controller 16 which may reside in a control room 18 and receives the sensed process variable from transmitter 12 and valve positioner assembly 20 which receives a desired valve setpoint from controller 16 and which controls a physical variable in process 14. Transmitter 12 provides the sensed process variable over a first two-wire circuit formed by cabling 22a and 22b, and controller 16 communicates with positioner assembly 20 over loop 24a and 24b.

A valve positioner circuit 26 in positioner assembly 20 receives a 4-20 mA current representative of the desired valve position, and provides a 3-15 psi pneumatic output 28 to pneumatic actuator 30. Actuator 30 controls valve 32 which controls a flow in process 14. Actuator 30 provides pressure and position feedback 34 to positioner 26.

Figure 2:
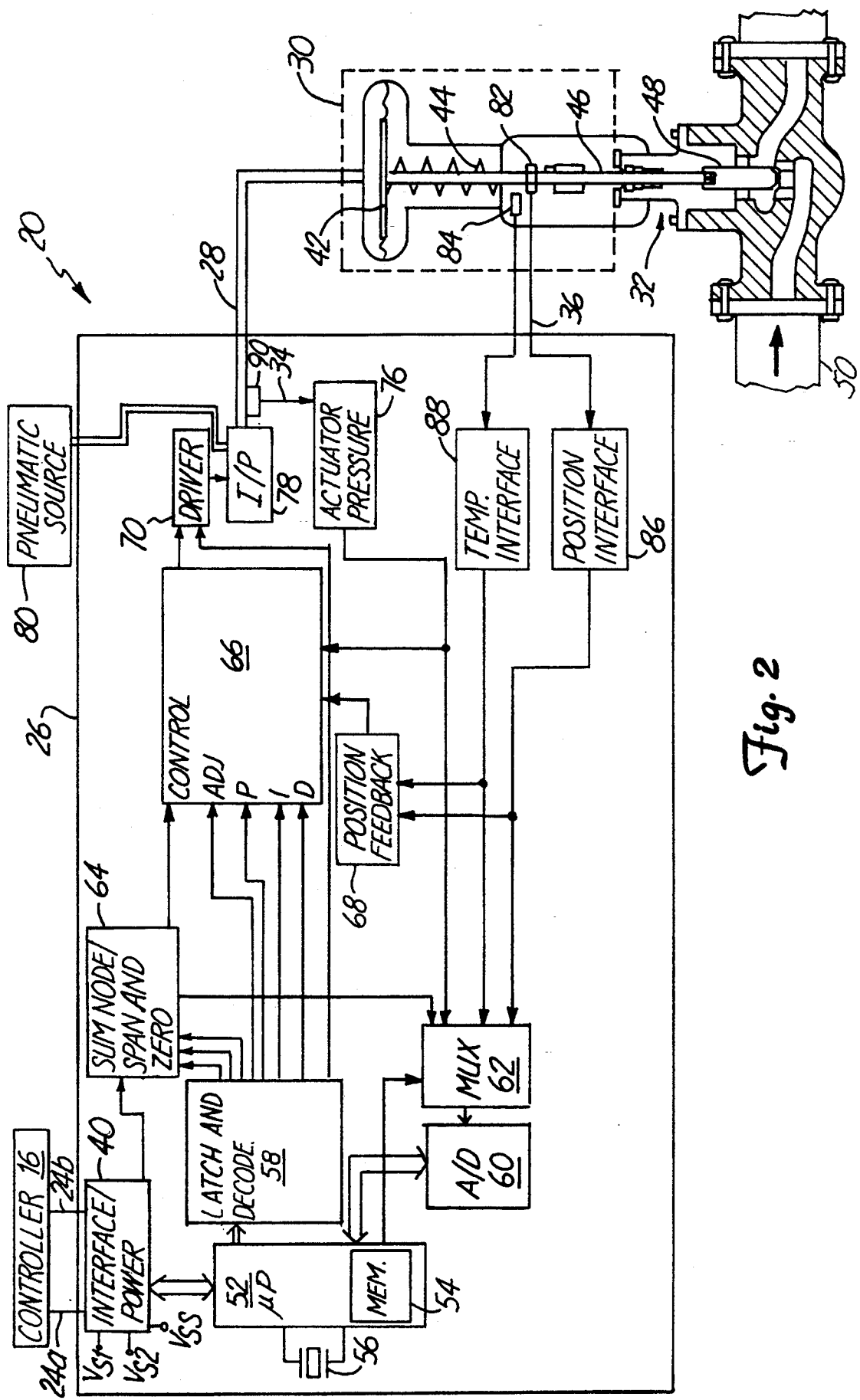
FIG. 2 is a block diagram of the valve positioner of FIG. 1.

In FIG. 2, positioner 26 includes communications interface 40 for receiving a 4-20 mA current signal representative of the desired position of valve 32 from controller 16 over wires or a digital setpoint 24a/24b. Interface 40 also provides power supply outputs VS1 and VS2 generated from loop 24a/24b. Circuit 24a/24b can also be a three or four wire circuit as used in the process control industry. Pneumatic output 28 of positioner 26 is connected to valve 32 through actuator 30 so that the applied pressure deflects diaphragm 42 which exerts a force on spring 44 and moves stem 46 within valve 32. Plug 48 mates with stem 46 to slidably obstruct a passageway in valve 32 and control the flow of fluid in pipe 50. Other types of valves, such as rotary valves, may also be used.

Microprocessor 52, which is clocked by oscillator 56, includes on-chip program and storage memory 54 and is preferably made in a low power technology such as CMOS. Microprocessor 52 is connected to a latch and decode circuit 58 and analog-to-digital converter (A/D) 60. Analog-to-digital converter 60 couples to multiplexer MUX 62.

Sum-node circuit 64 is coupled to interface/power supply 40 and receives a signal representative of the desired valve position from interface 40. Sum-node 64 receives three signals from latch and decode circuitry 58: span, zero and input roll/off control. Sum-node 64 provides a position request signal to controller 66.

Control circuit 66 receives four digital control constants from latch and decode circuit 58 representative of the proportional gain signal P), the integral (I), and the derivative (D), along with a position request adjustment signal. The PID control equation which analog circuit 66 implements is given by:

Control (Command) Output = \hfill Equation 1

$$P \cdot e(t) + I \int e(t)dt + D \cdot \frac{de(t)}{dt} + C_0$$

where e(t) is the difference between the desired valve position and the current valve position, t is time, $C_o$ is the desired control (command) Output.

Control circuit 66 also receives feedback 34 from position and actuator pressure feedback circuitry 68 and 76. Control circuit 66 provides a control signal to driver circuitry 70 which also receives a pneumatic slew rate control input from circuitry 58. I/P transducer 78 (which includes a booster stage) regulates pressurized air from pneumatic source 80 as a function of the coil drive voltage signal.

Position sensor 82 is coupled to valve stem 46 and temperature sensor 84 is positioned proximate to valve stem 46. Signals from sensors 82 and 84 are provided to multiplexer 62 through position interface 86 and temperature interface 88, respectively. Circuit 68 outputs a temperature compensated position signal to control circuit 66. Actuator pressure interface 76 receives a feedback signal 34 from pressure sensor 90, which measures the pressure in pressure line 28 and provides an input to multiplexer 62 and feedback to control circuit 66. Microprocessor 52 periodically samples the inputs to MUX 62 through A/D converter 60.

There is a continuing need to improve the accuracy with which control valves are positioned. Existing valve positioning devices with a microprocessor allow improved control valve positioning. Additionally, the microprocessor can be used to monitor performance and diagnostics of the control valve. The benefits of an electronic microprocessor-based positioner are extensive and provide many advantages in controlling operation of a valve.

In the present invention, power reduction is achieved by incorporating analog circuitry controlled by microprocessor 52. The analog circuitry performs some of the computationally intensive functions (notably the PID control equation) otherwise performed by microprocessor 52, thus allowing microprocessor 52 to perform other functions without sacrificing control system band width. Thus, the invention provides low power PID control at high speed and wide band-width.

Microprocessor 52 periodically updates the constants of the PID equation. In one embodiment, there are four cases which affect the update rate: calibration, startup, steady state operation, and response to transients. During startup, an initial set of constants is chosen based on, for example, past startups or predetermined values. During steady state operation, the constants are infrequently updated but with a high level of accuracy and control. When responding to abrupt changes, the constants are frequently updated. Typically, when the constants need frequent updating, their accuracy is less important thus allowing faster processing. For example, updates may occur every 0.1 to 0.25 seconds. As the values get closer to their final value, the updating may be less frequent allowing microprocessor 52 greater time for higher accuracy.

Analog circuitry includes sum-node/span and zero adjustment circuitry 64, control block 66, position feedback circuitry 68, driver circuitry 70 and diagnostic circuitry 72. The control equation implemented in the analog circuitry is determined by microprocessor 52 which provides digital control signals to the circuitry. Circuit 66 outputs a command output according to Equation 1.

Figure 3:
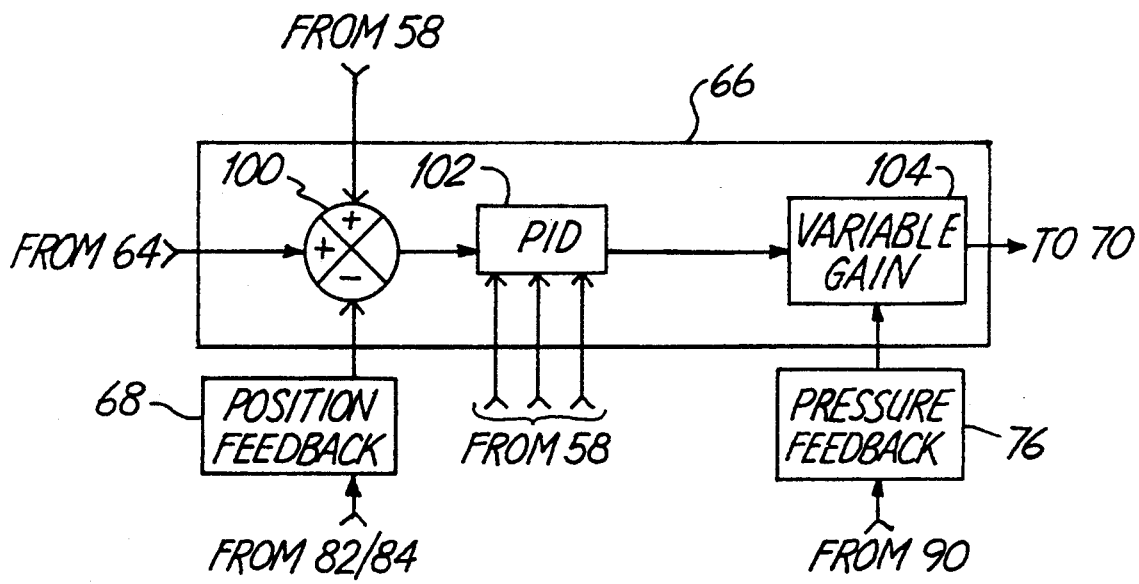
FIG. 3 is a block diagram of control circuitry of FIG. 2.

FIG. 3 is a simplified schematic diagram showing a portion of control circuit 66. Circuit 66 includes sum-node 100, PID circuitry 102 and variable gain circuitry 104. Sum-node 100 receives a representation of a desired valve position from circuitry 64, an adjustment input from latch and decode circuitry 58 which allows microprocessor 52 to adjust the request, and a position feedback signal from circuitry 68. Node 100 sums these signals and provides them to PID circuitry 102. PID circuitry 102 receives the latched P, I and D digital control signals from circuitry 58 and provides a control signal output to variable gain circuitry 104. Gain of circuitry 104 is controlled by a pressure feedback output from pressure feedback circuitry 76 and provides a control signal output to driver 70.

Figure 4:
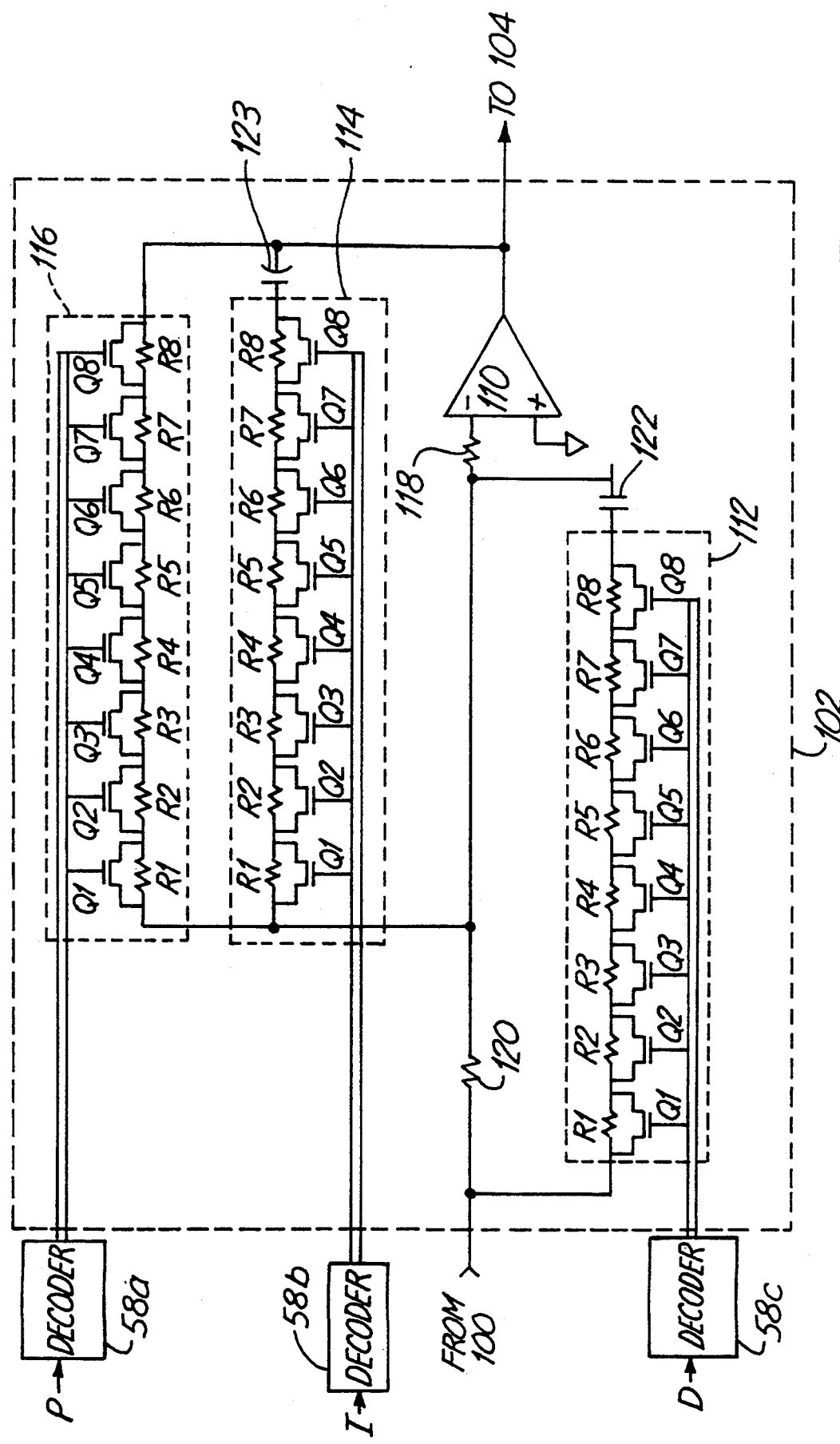
FIG. 4 is a simplified electrical schematic diagram of a PID controller of FIG. 3.

FIG. 4 is a simplified schematic diagram of PID circuit 102 in accordance with the present invention. PID circuitry 102 includes operational amplifier 110, analog switch 112, analog switch 114 and analog switch 116. Switches 112–116, respectively, control the P, I and D constants of circuit 102. The inverting input of OPAMP 110 connects to resistor 118 which connects to node 100 through resistor 120. The non-inverting input to OPAMP 110 is coupled to signal ground and the output couples to driver 70. Analog switch 112 is connected in series with capacitor 122 across resistor 120. Analog switches 112–116 include resistors $R_1$–$R_8$ and field effect transistors $Q_1$–$Q_8$. Switch 116 controls P, switch 114 and capacitor 123 control I and switch 112 and capacitor 122 control D.

The gates of FETs $Q_1$–$Q_8$ are coupled to circuits 58a, 58b and 58c of latch and decode circuitry 58 shown in FIG. 2. Latch and decode circuitry 58a, 58b and 58c receives P, I, and D inputs from microprocessor 52. For example, decode 58c receives a digital value to the derivative constant (D) from microprocessor 52. Decode and latch circuit 58c decodes this value into a combination of analog voltage signals provided to the gates of transistors $Q_1$–$Q_8$, thereby selectively controlling whether each of transistors $Q_1$–$Q_8$ is either on or off. Decoder and latch circuitry 58c latches this data following the decoding step so that microprocessor 52 does not continuously supply digital control signals to decoder 58c. Based upon the combination of transistors $Q_1$–$Q_8$ turned on, the resistance provided by analog switch 112 is controlled to determine the derivative constant of PID circuit 102. Decoders 58a and 58b work in a similar manner whereby the proportional (P) and integral (I) constants are output by microprocessor 52 and selectively modify resistances 114 and 116, respectively.

Valve positioner 20 operates using a hybrid of digital and analog circuitry and thereby achieves advantages of both types of circuitry. Analog circuitry performs much of the control which requires high speed and wide band-width so that microprocessor 52 operates with reduced power. However, microprocessor 52 controls operation of analog circuitry through latch and decode 58 such that control of valve 32 is not sacrificed. Referring to FIG. 2, microprocessor 52 receives a desired position request from two-wire control loop 24a/24b and feedback from analog-to-digital converter 60. Based upon these inputs, microprocessor 52 configures the analog circuitry by supplying the digital control constants to latch and decode circuitry 56. FIG. 4 is an example of PID circuitry 102 which operates under control of microprocessor 52. Microprocessor 52 also controls sum node/zero and span circuity 64, the slew rate of actuator drive 70, and position request adjustment to circuit 66 of FIG. 3. Although the specific example shows adjustment of a resistance value through switches 112–116, other analog parameters can be adjusted by microprocessor 52 such as current, inductance, capacitance, etc., using similar circuitry in accordance with the invention. Standard circuits in most engineering applications handbooks can be controlled using the present techniques. For example, a voltage controlled gain circuit is controlled by providing a voltage output from A/D converter 60 to the circuit voltage input.

Figure 5:
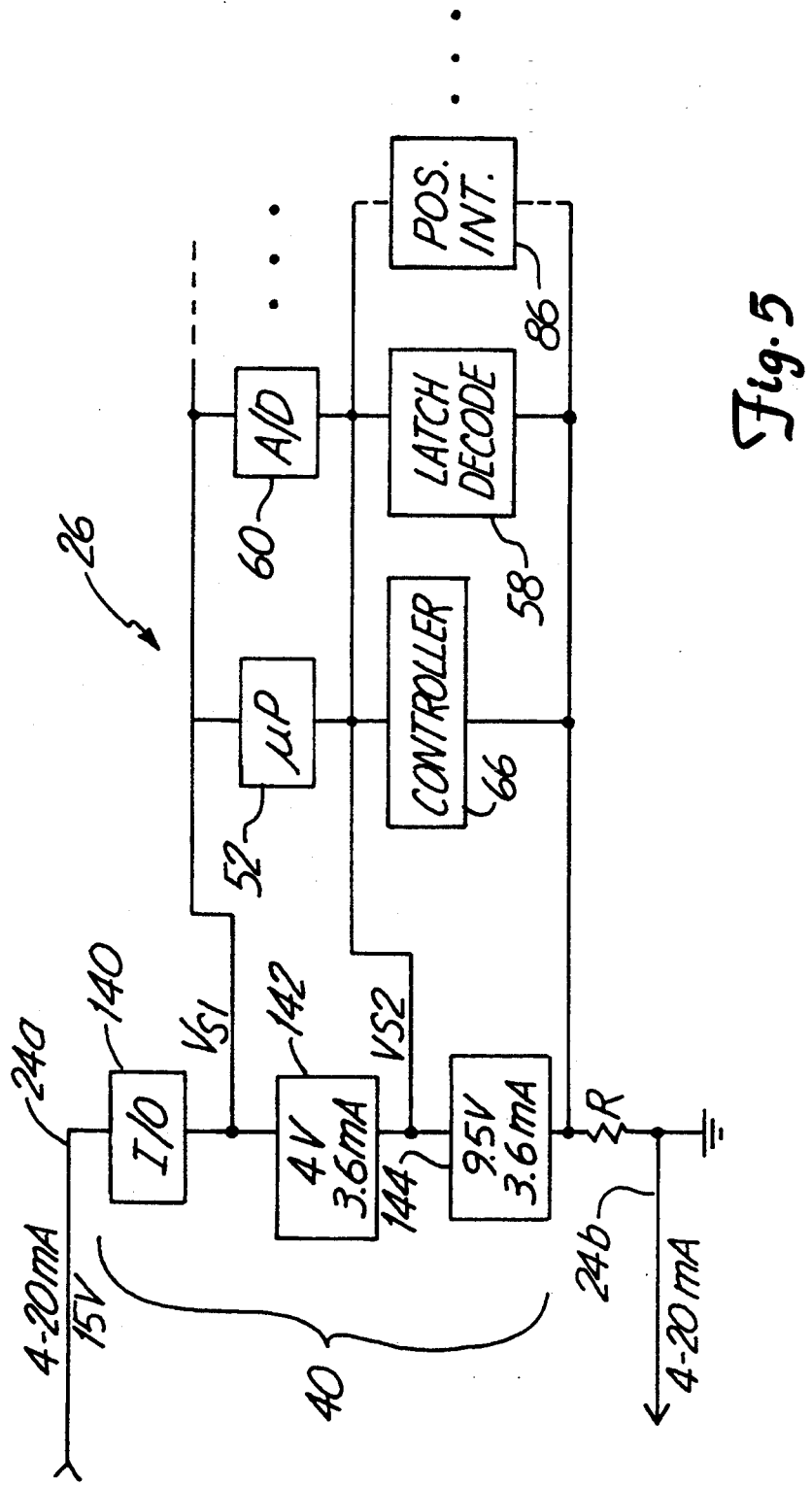
FIG. 5 is a simplified electrical schematic diagram of power supply circuitry used to power the valve positioner of FIG. 2.

FIG. 5 is a simplified diagram of valve positioner 26 showing a power supply connection in accordance with the present invention. Positioner 26 is shown receiving all electrical power through loop 24a/24b, and does not require an additional power source. FIG. 5 shows interface 40 which includes input/output circuity 140, a 4 volt power supply 142 and a 9.5 volt power supply 144 connected in series with two-wire loop 24a/24b. Four volt power supply 142 provides voltage VS1 for operation of microprocessor 52 and other digital circuitry. Supply 144 provides VS2, a 9.5 volt regulated power supply for analog circuity. I/O circuity 140 receives the desired position signal over loop 24a/24b in accordance with techniques known in the process control industry. In the embodiment shown in FIG. 5, decode circuitry 58 and sensor interface circuitry are powered by 9.5 volt power supply 144. The circuitry of FIG. 5 shows "stacked" power supplies which use almost the entire 15 volt maximum allowed between wires 24a and 24b. If the stacked power supply shown in FIG. 5 is employed, level shifting circuitry (not shown) is necessary to shift levels of various signals.

Although the present invention has been described with reference to preferred embodiments, workers skilled in the art will recognize that changes may be made in form and detail without departing from the spirit and scope of the invention. For example, actuators other than pneumatic based actuators may be employed, and decode circuitry 58 may comprise a ROM.

What is claimed is:

1. A valve positioner receiving power from a process control loop, comprising:
    an interface circuit coupled to the loop for receiving a desired valve position;
    an actuator coupled to a valve for positioning the valve in response to a command output;
    a microprocessor for calculating a digital control signal; and
    analog circuitry providing the command output to the actuator in response to the desired valve position as a function of a control equation implemented in the analog circuitry wherein the control equation is a function of the digital control signal.

2. The valve positioner of claim 1 wherein the control equation is a PID equation of the form:

$$\text{Command Output} = P \cdot e(t) + I \int e(t)dt + D \cdot \frac{de(t)}{dt} + C_0$$

where $e(t)$ is the difference between the desired valve position and the current valve position, t is time, and $C_0$ is a desired control (command) output.

3. The valve positioner of claim 1 wherein the analog circuitry includes a switch responsive to the digital control signal for selectively coupling the analog circuitry to a preselected electrical component.

4. The valve positioner of claim 3 wherein the switch comprises a plurality of transistors.

5. The valve positioner of claim 3 wherein the preselected electrical component is an electrical resistance.

6. The valve positioner of claim 1 including a latch coupled to the microprocessor for latching the digital control signal, wherein the microprocessor periodically outputs an updated digital control signal and actuates the latch to latch the updated digital control signal.

7. The valve positioner of claim 1 including a sensor sensing an operating parameter of valve operation and providing feedback to the analog circuitry.

8. The valve positioner of claim 1 including power supply circuitry comprising:
    a first power supply coupled to the control loop providing a first regulated voltage output to power first circuitry in the valve positioner; and
    a second power supply coupled to the control loop and the first power supply providing a second regulated voltage output to power second circuitry in the valve positioner.

9. The valve positioner of claim 8 wherein the first power supply provides power to digital circuitry.

10. A valve positioner for use in a process control loop, comprising:
    an interface adapted to couple to the loop to receive a desired valve position and electrical power to operate the valve positioner from the loop;
    an actuator adapted to position a valve in response to a command output;
    microprocessor circuitry for calculating values of at least one constant in a PID control equation; and
    an analog PID control circuit providing the command output to the actuator based upon a PID control equation configured by the PID constant provided by the microprocessor.

11. The valve positioner of claim 10 wherein the PID control equation is of the form:

$$\text{Command Output} = P \cdot e(t) + I \int e(t)dt + D \cdot \frac{de(t)}{dt} + C_0$$

where e(t) is the difference between the desired valve position and the current valve position, t is time, and $C_0$ is a desired control (command) output.

12. The valve positioner of claim 10 including a switch responsive to the PID constant provided by the microprocessor for selectively coupling the analog PID control circuitry to a preselected electrical component.

13. The valve positioner of claim 12 wherein the switch comprises a plurality of transistors.

14. The valve positioner of claim 13 wherein the preselected electrical component is an electrical resistance.

15. The valve positioner of claim 10 including a latch coupled to the microprocessor for latching the PID constant, wherein the microprocessor periodically outputs an updated PID constant which is held in the latch.

16. The valve positioner of claim 10 including a sensor sensing an operating parameter of valve operation and providing feedback to the analog PID control circuit.

17. The valve positioner of claim 10 including power supply circuitry comprising:
   a first power supply coupled to the control loop providing a first regulated voltage output to power first circuitry in the valve positioner; and
   a second power supply coupled to the control loop and the first power supply providing a second regulated voltage output to power second circuitry in the valve positioner.

18. The valve positioner of claim 17 wherein the first power supply provides power to digital circuitry.

\* \* \* \* \*

UNITED STATES PATENT AND TRADEMARK OFFICE
CERTIFICATE OF CORRECTION

PATENT NO. : 5,431,182
DATED : July 11, 1995
INVENTOR(S) : Gregory C. Brown

It is certified that error appears in the above-indentified patent and that said Letters Patent is hereby corrected as shown below:

On the title page: Item

[73], Assignee:, please delete "," between "Rosemount" and "Inc.".

Col. 1, line 27, please change "Hodbus" to --Modbus--.

Col. 2, line 7, please change "Dower" to --power--.

Col. 2, line 16, please change "FID" to --PID--.

Col. 4, line 65, please change "to" to --of--.

Signed and Sealed this

Thirteenth Day of February, 1996

Attest:

BRUCE LEHMAN

*Attesting Officer*     *Commissioner of Patents and Trademarks*